Figures 1, 2:
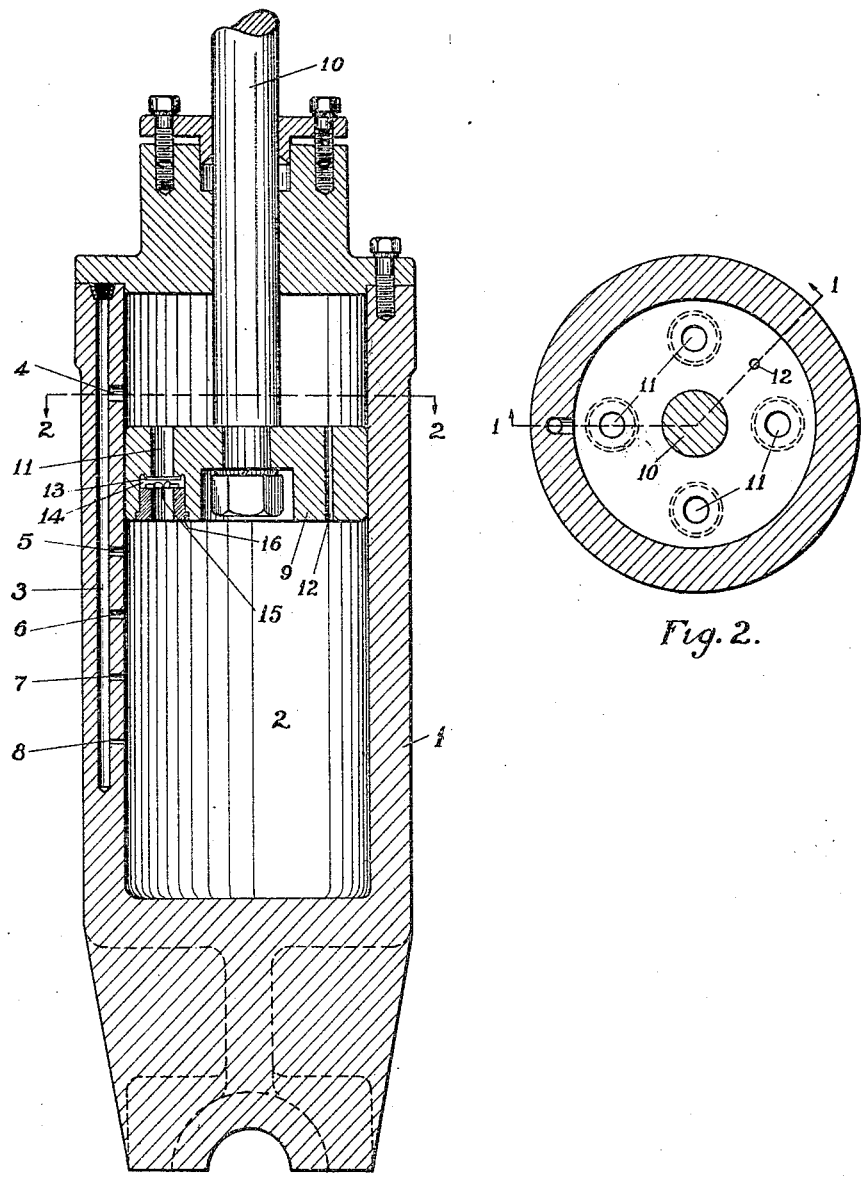

Aug. 4, 1925.

A. D. ZIEBARTH 1,548,773

CHECK CYLINDER AND VALVE

Filed Oct. 13 1924

INVENTOR.
A. D. Ziebarth.
BY Merrill M. Blackburn
ATTORNEY

Patented Aug. 4, 1925.

1,548,773

UNITED STATES PATENT OFFICE.

ARTHUR D. ZIEBARTH, OF DAVENPORT, IOWA.

CHECK CYLINDER AND VALVE.

Application filed October 13, 1924. Serial No. 743,432.

*To all whom it may concern:*

Be it known that I, ARTHUR D. ZIEBARTH, of Davenport, Iowa, have invented certain new and useful Improvements in Check Cylinders and Valves, of which the following is a specification.

My invention relates in general to cushioning devices for cushioning the operation of machinery and more particularly to a check cylinder for use with roll-over machines, in foundries, and among the objects of my invention are to improve upon the construction of check cylinders; to provide an improved fluid relief mechanism for check cylinders; to provide, in a machine of the class referred to, improved means for relieving the air pressure from the check cylinders; to provide an improved valve in a mechanism of the class described; and such further objects, advantages and capabilities as are inherent in the mechanism disclosed and as will appear more fully hereafter.

My invention further resides in the combination, construction and arrangement of parts illustrated in the accompanying drawing and, while I have shown therein what is now considered the preferred embodiment of my invention, I desire the same to be understood as illustrative only and not as limiting my invention.

In the accompanying drawing, Fig. 1 is a longitudinal section through a check cylinder construction in accordance with my invention and taken substantially along the plane indicated by the line 1—1, Fig. 2, and Fig. 2 is a cross section through this mechanism substantially along the plane indicated by the line 2—2, Fig. 1.

Referring more in detail to the annexed drawing numeral 1 designates in general the check cylinder having in the interior thereof a cylindrical opening 2 and extending longitudinally thereof, and substantially parallel with the opening 2, another cylindrical opening 3 which is connected to the first cylindrical opening by a series of openings 4, 5, 6, 7 and 8 which are graduated in size from that numbered 4 to that numbered 8. The extreme openings 4 and 8 are preferably spaced at a distance from the opposite ends of the cylindrical opening 2 to provide an unvented space at each end of the cylinder.

Within the cylinder chamber 2 is located a piston comprising a head 9 and an operating shaft 10. Extending through the head 9 are a plurality of openings 11 and 12. These openings connect the parts of the chamber 2 on opposite sides of the piston head in order to permit the flow of fluid from one side to the other of the piston during the operation of the machine. The opening 12 is preferably of small cross-sectional area in order that the amount of air passing therethrough may be reduced to the desired minimum. The openings 11 are of a larger diameter and, if not controlled, would permit rapid flow of the air from one side to the other of the piston when the latter reciprocates in the chamber 2. In order to prevent such rapid flow of air when the piston is going down, a plate valve 13 is mounted in an enlargement 14 of the vent opening 11. It will thus be seen that, if the piston moves downwardly, the air rushing through the openings 11 causes the plate 13 to seat against a valve seat provided around the opening and thus preventing the air from passing through these openings. When the piston moves in the opposite direction, the air forces the plate 13 downwardly until it contacts with the lugs 15 on the upper face of the retaining member 16 which is secured in the enlargement 14 in any desired manner, such as being screwed into the same. The lugs 15 hold the plate 13 up away from member 16 sufficiently to permit the air to pass between the plate and the said member, thereby permitting the rapid venting of the upper portion of the chamber 2, as the piston moves upwardly.

Assuming the piston to be at the upper limit of its movement, the hole 4 would be below the upper face of the piston and no venting could take place therethrough until the piston had moved downwardly sufficiently to uncover this opening. During this initial portion of the movement of the piston, venting would only take place through the openings 11 and 12. The action would consequently not be sudden. However, as soon as the opening 4 becomes uncovered, air will be forced out through the openings 5, 6, 7 and 8 into the channel 3 and from there through the opening 4. During this time the principal venting will not be through the openings 11 and 12, but through the openings 4 to 8, inclusive. As the piston passes downwardly still farther it will cover first the opening 5 and then the other openings in succession and, as it passes downwardly, will leave these openings behind venting into the portion of chamber 2 above the piston head. The farther down the piston goes the less the number of vent openings below the same will become. Also, the smaller will be the cross-sectional area and, consequently the less the rate of venting. As soon as the opening 8 has been covered by the piston, the venting will then be entirely or substantially entirely through the opening 12. This being a small opening, the venting will be very slow and the air cushion in the bottom of the chamber 2 will cause the roll-over unit to settle slowly enough into place so that there will be no sudden jolting and consequently no breaking of the mold.

It will be seen from the foregoing that I have provided an improved check cylinder, provided improved fluid relief mechanism for check cylinder, provided an improved valve mechanism for a structure of the character described, and otherwise improved upon such structure. It will be understood that the specific disclosure of the structure set forth herein may be departed from without departing from the spirit of my invention.

Having now described my invention, I claim:

1. A check cylinder having a main, substantially cylindrical opening, an auxiliary opening adjacent thereto and extending longitudinally thereof, said cylinder openings being mutually exclusive, and openings of graduated sizes connecting the aforesaid openings, in combination with a piston having a longitudinal reciprocating movement in the first named opening, said piston being provided with relief means.

2. A check cylinder having a main, substantially cylindrical opening, an auxiliary opening adjacent thereto and extending longitudinally thereof and openings of graduated sizes connecting the aforesaid openings, in combination with a piston having a longitudinal reciprocating movement in the first named openings, said piston being provided with relief means, said relief means including an opening of small cross-sectional area extending through the piston and communicating with the cylinder opening.

3. A check cylinder and valve comprising a cylinder and a piston longitudinally reciprocable therein, said cylinder having a relief passage in a longitudinal wall thereof, openings spaced along the cylinder and connecting the relief passage with the cylinder chamber, and said piston having a plurality of vent openings communicating with the cylinder chamber on opposite sides of the piston, part of said vent openings venting freely in both directions of movement of the piston and part having means for reducing the venting action in one direction.

4. In a check cylinder mechanism, a cylinder provided with a pair of mutually non-inclusive substantially cylindrical openings and a series of openings connecting the same at different points along their length, the last named openings gradually decreasing in size from one end toward the other, in combination with a longitudinally reciprocable piston having vent openings communicating with the cylinder upon opposite sides of the piston body.

5. In a check cylinder mechanism, a cylinder provided with a pair of mutually exclusive substantially cylindrical openings and a series of openings connecting the same at different points along their length, the last named openings gradually decreasing in size from one end toward the other, the openings at the ends of the series being spaced from the corresponding ends of the cylinder to provide an air cushion of greater cushioning effect, in combination with a longitudinally reciprocable piston having vent openings communicating with the cylinder upon opposite sides of the piston body.

6. In a check cylinder mechanism, a cylinder provided with a pair of substantially cylindrical openings and a series of openings connecting the same at different points along their length, the last named openings gradually decreasing in size from one end toward the other, the openings at the ends of the series being sufficiently spaced from the corresponding ends of the cylinder to provide an air cushion of greater cushioning effect, in combination with a longitudinally reciprocable piston having vent openings communicating with the cylinder upon opposite sides of the piston body, one opening being of small diameter and functioning freely in both directions of movement of the piston and others being larger and provided with valves which permit passage of air when the piston is moving in one direction and substantially prevent it when the piston is moving in the opposite direction.

7. In a check cylinder mechanism, a cylinder provided with a pair of substantially cylindrical openings and a series of openings connecting the same at different points along their length, the last named openings gradually decreasing in size from one end toward the other, the openings at the ends of the series being spaced from the corresponding ends of the cylinder to provide an air cushion of greater cushioning effect, in combination with a longitudinally reciprocable piston having vent openings communicating with the cylinder upon opposite sides of the piston body, one opening being of small diameter and functioning freely in both directions of movement of the piston and others being larger and provided with valves which permit passage of air when the piston is moving in one direction and substantially prevent it when the piston is moving in the opposite direction, said valves each including a plate fitting tightly against a seat surrounding the venting opening when the piston is moving in one direction and resting on projections adapted to hold the plate unseated when the piston is moving in the opposite direction.

In witness whereof, I hereunto subscribe my name to this specification.

ARTHUR D. ZIEBARTH.